H. L. WADSWORTH.
SOUND RECORDING AND REPRODUCING MACHINE.
APPLICATION FILED MAR. 7, 1917.
1,312,461.
Patented Aug. 5, 1919.
7 SHEETS—SHEET 7.
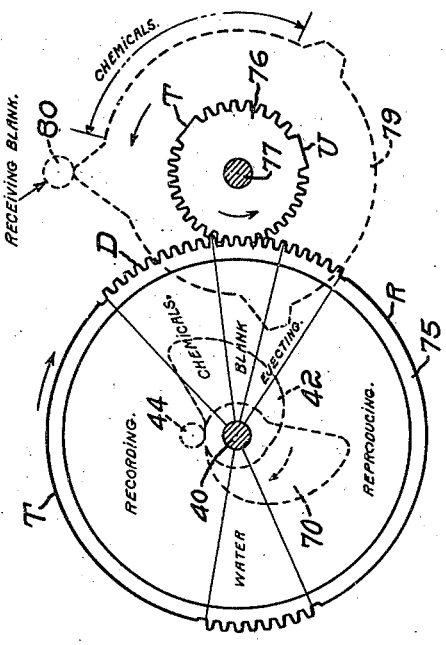
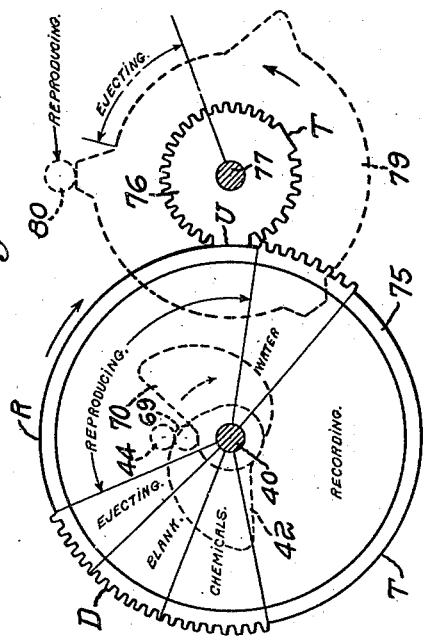
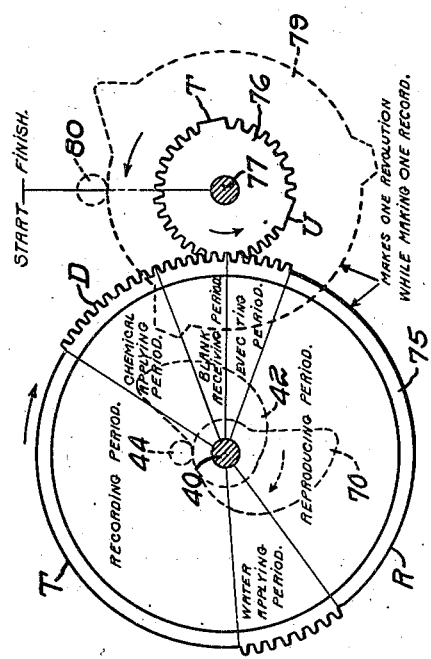
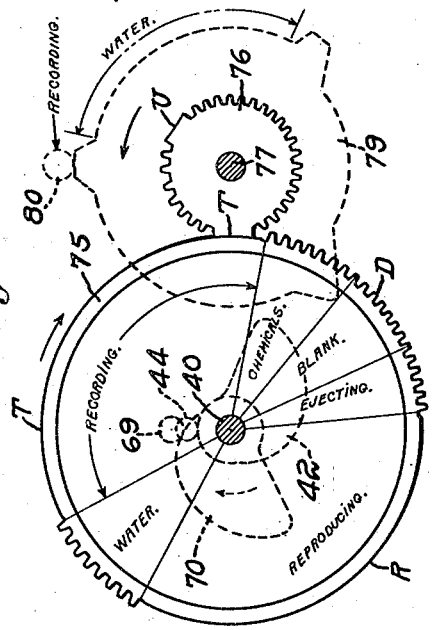
Inventor:
Henry L. Wadsworth,
by Emery Booth Janney Varney
Attys.

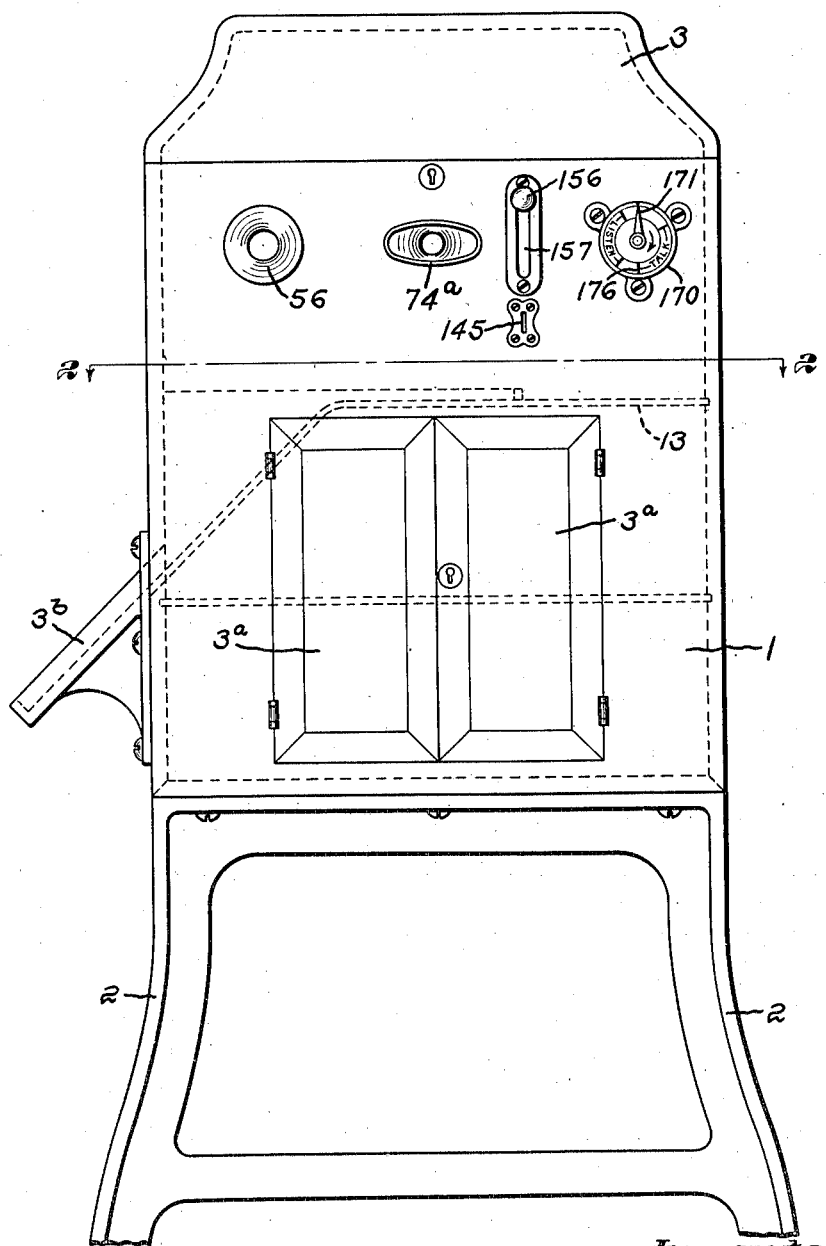

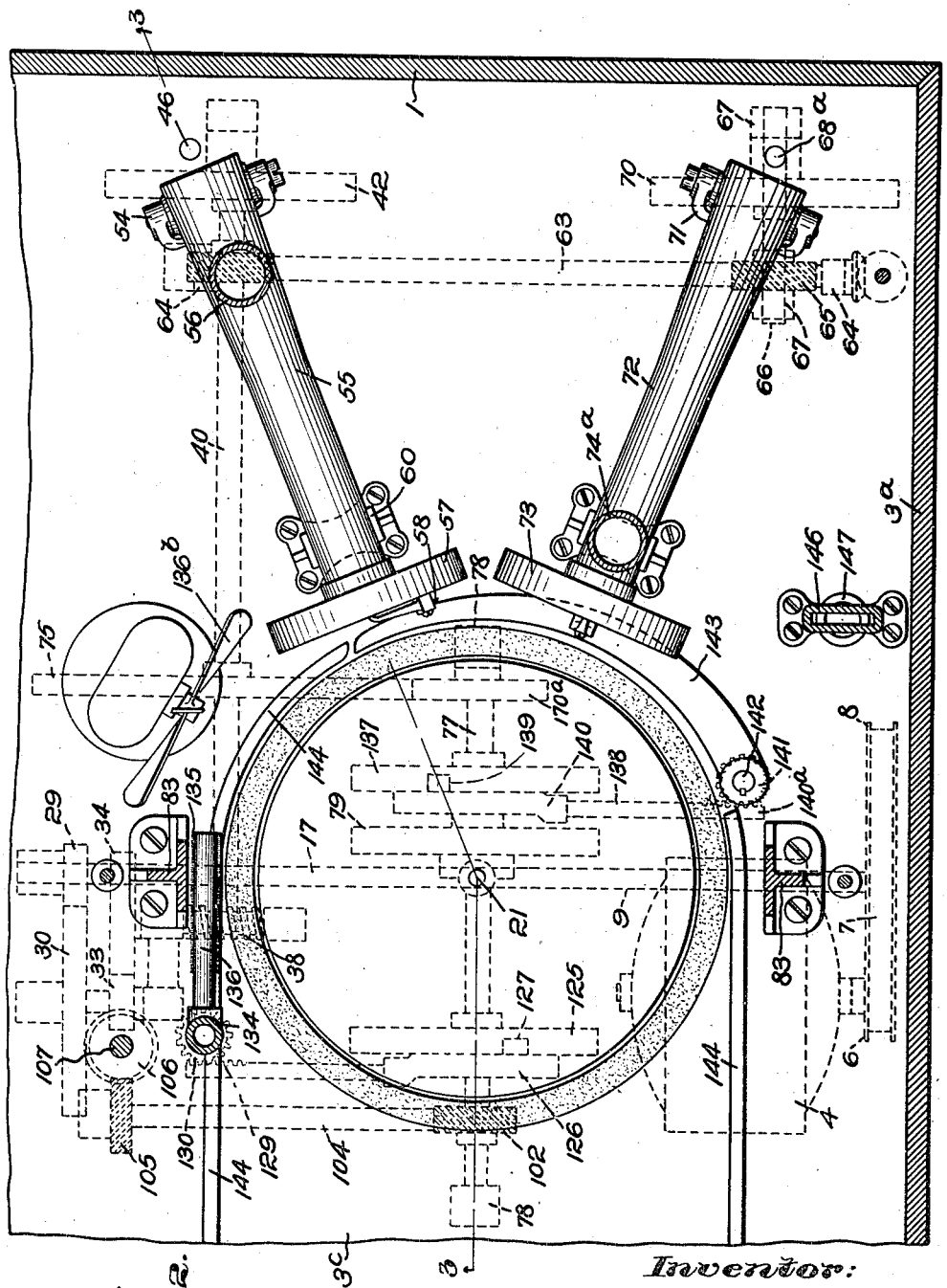

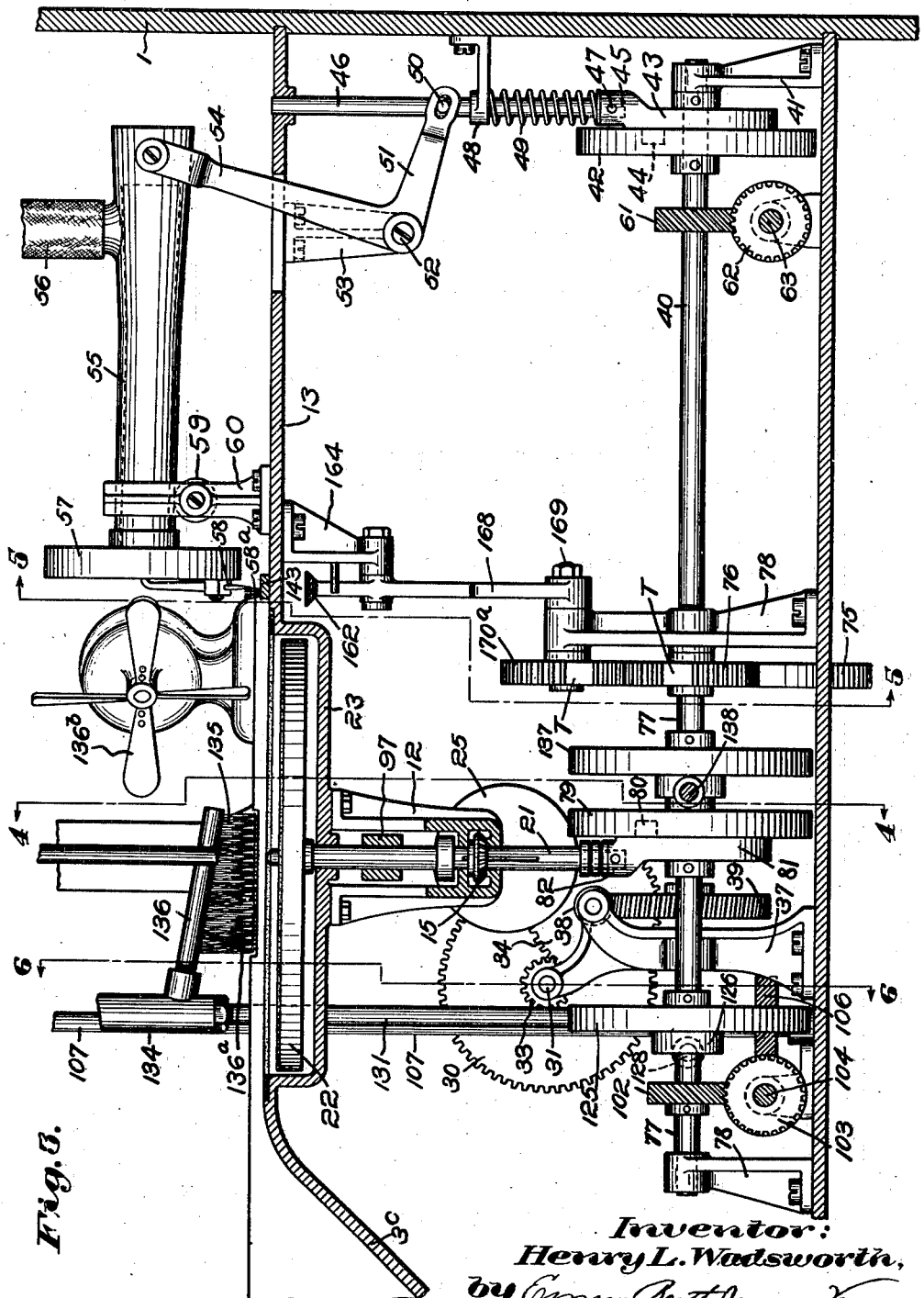

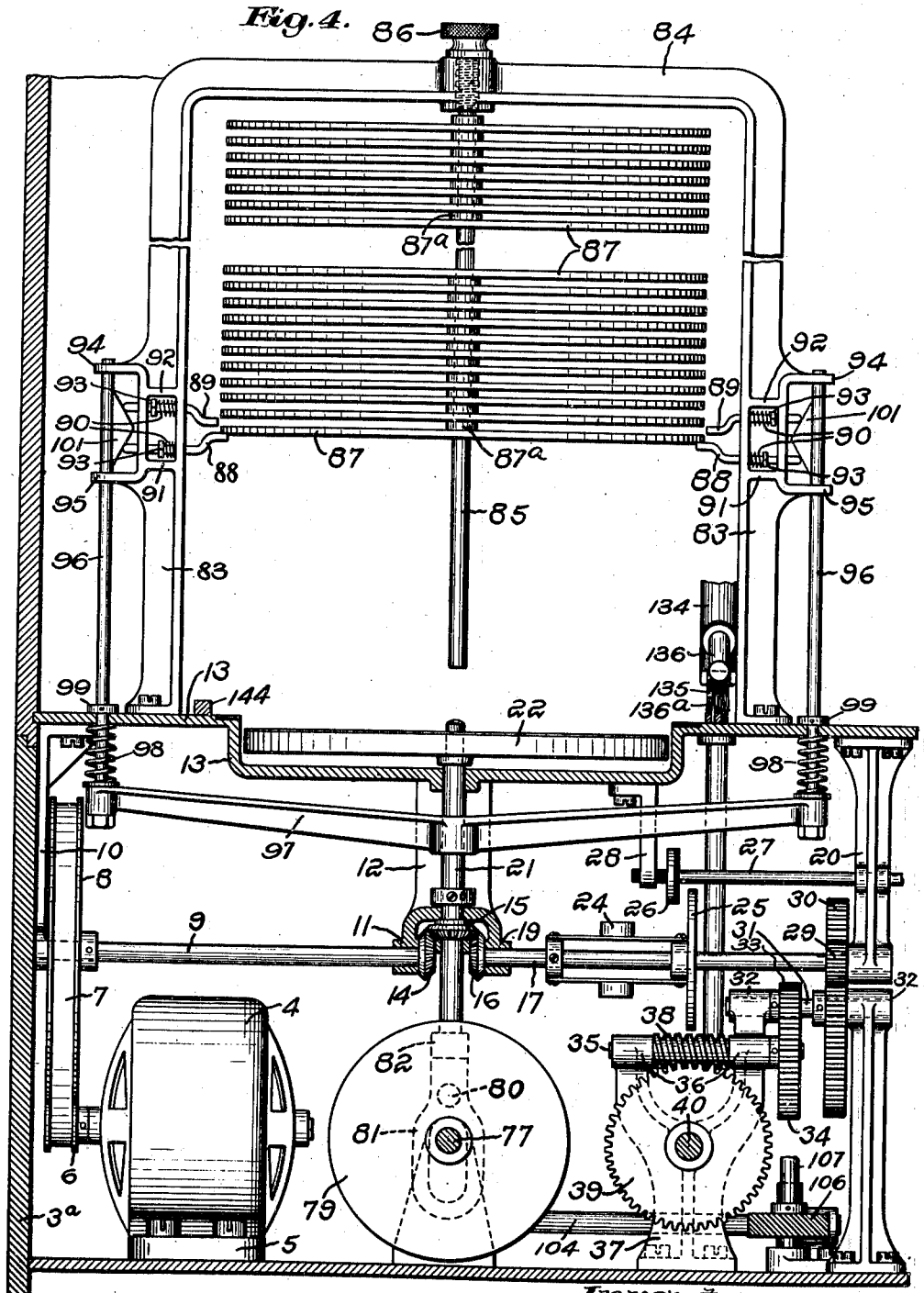

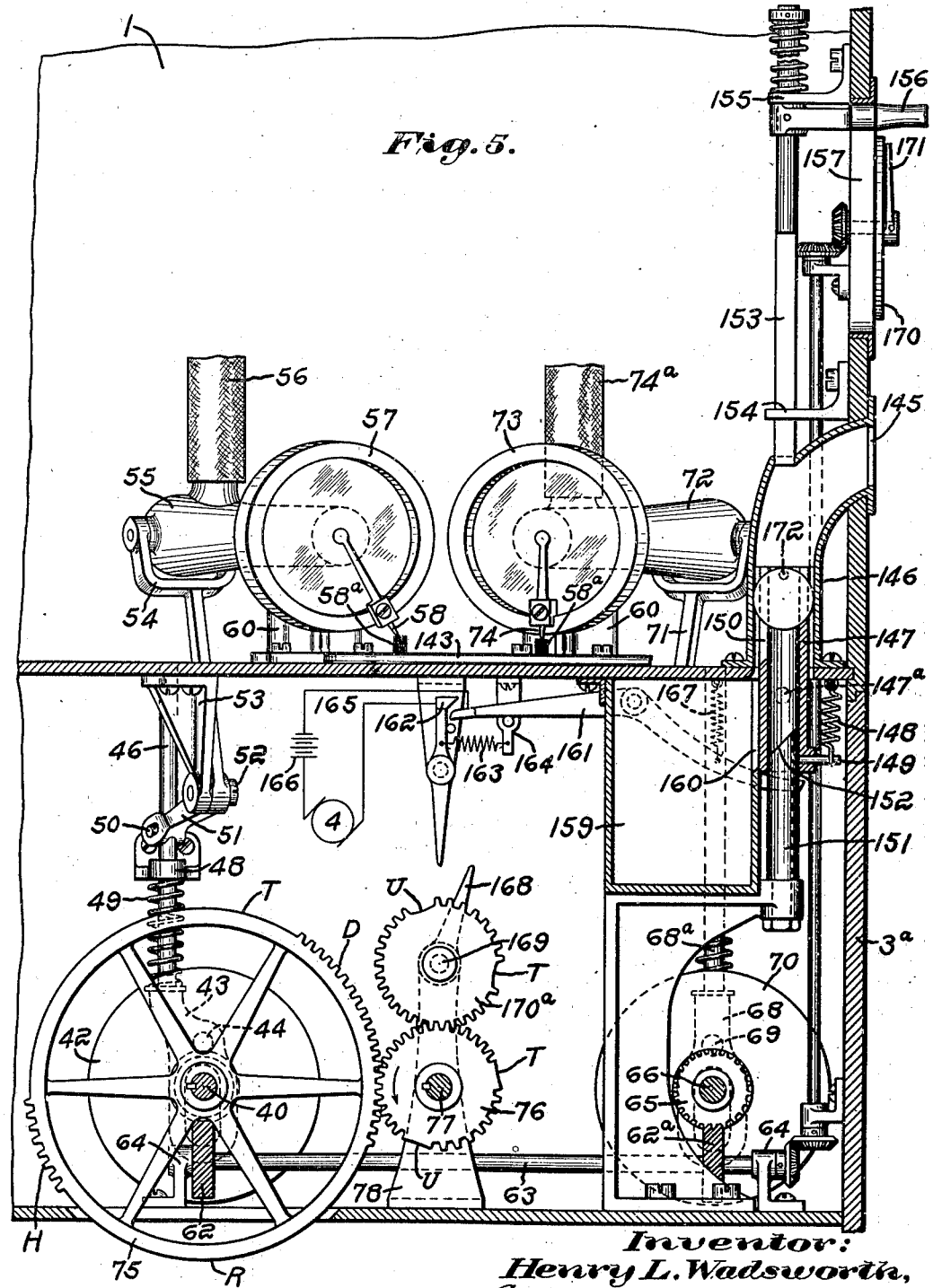

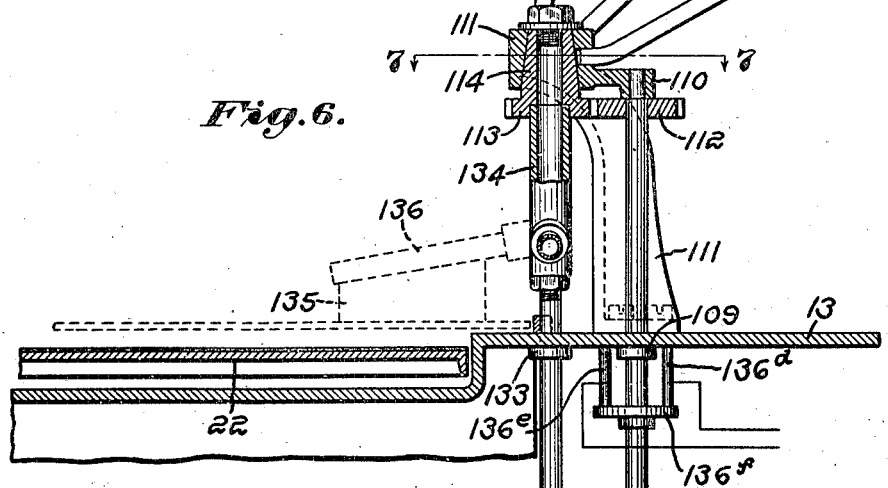

UNITED STATES PATENT OFFICE.

HENRY L. WADSWORTH, OF LEXINGTON, MASSACHUSETTS.

SOUND RECORDING AND REPRODUCING MACHINE.

1,312,461.     Specification of Letters Patent.     Patented Aug. 5, 1919.

Application filed March 7, 1917. Serial No. 153,141.

*To all whom it may concern:*

Be it known that I, HENRY L. WADSWORTH, a citizen of the United States, and resident of Lexington, in the county of Middlesex and Commonwealth of Massachusetts, have invented an Improvement in Sound Recording and Reproducing Machines, of which the following description, in connection with the accompanying drawings, is a specification, like characters on the drawings representing like parts.

This invention relates to sound recording and reproducing machines and aims to provide a novel, combined sound recording, reproducing and record tablet delivering machine, adapted to make a sound record upon a blank tablet, reproduce and thus verify it for the talker so that he can know that the tablet correctly records his message, and then deliver the tablet to him for such use as he may desire to make of it, as to be forwarded to his correspondent, or filed away for preservation.

While any convenient means may be used for operating the machine, the present embodiment of my invention is provided with a motor and may or not be used as a coin-controlled machine.

In the drawings of the embodiment of my invention selected for description and illustration:

Figure 1 is a front elevation of the cabinet containing the mechanism;

Fig. 2 is a part plan and horizontal section on the line 2—2 of Fig. 1;

Fig. 3 is a vertical section on the line 3—3 of Fig. 2 looking toward the top of the sheet;

Fig. 4 is a vertical section on the line 4—4 of Fig. 3 from the right;

Fig. 5 is a vertical section, partly broken away, on the line 5—5 of Fig. 3, from the left;

Fig. 6 is a partial vertical section on the line 6—6 of Fig. 3;

Fig. 7 is a horizontal sectional detail on an enlarged scale on the line 7—7 of Fig. 6; and Fig. 8 is a diagram representing the successive positions of the tablet carrier during the performance of the several steps leading to the making and delivery of the record-bearing tablet.

Figs. 9-12 inclusive are details of certain cam and gear constructions and are partly diagrammatic, showing the relative movements of the elements during the performance of the several functions of the machine.

Referring first to Fig. 1, my invention is shown as comprising a suitable case or cabinet 1, which may extend to the floor or be supported upon convenient legs 2, 2, and provided with a hinged or removable top 3. The cabinet may also have for convenience doors 3ª leading to the motor compartment and the filing compartment, and an inclined delivery shelf 3ᵇ.

While power may be supplied by any suitable means, an electric motor 4 is shown herein, Fig. 4, mounted on a suitable base 5. The motor shaft carries a pulley 6 which conveniently may be connected, as by a belt 7, with a larger pulley 8 on the main shaft 9, carried in bearings 10 in the cabinet wall and 11 in the bracket 12, opposite thereto, suspended from the table 13 to be referred to.

The shaft 9, Fig. 4, carries a bevel gear 14 at its end, in mesh with a similar gear 15, on a shaft presently to be referred to, which, in turn, meshes with a third gear 16 on the end of a second shaft 17, in bearings 19 in the bracket 12 and the bracket 20 suspended from the table 13 at the opposite side of the cabinet.

The gear 15, Fig. 4, is splined to a vertically movable tablet carrier shaft 21, carrying at its upper end the tablet carrier, shown herein as a turntable 22 in a depressed portion or pocket 23 of the table 13, thus permitting vertical motion of the shaft for elevating and lowering the turntable 22 for the purposes hereinafter described, without interfering in any way with the rotation of the shaft 21 and its turntable by the gear 15. The depressed turntable pocket assists in the positioning of the turntable for the purposes hereinafter described.

The shaft 17, Fig. 4, is provided with a suitable governor 24, herein of the ball type, having a disk 25, adapted to be frictionally engaged by a second disk 26 of suitable material, as leather, on a rod 27 threaded to a bracket 28 and extended through the side of the cabinet and provided with any convenient handle, not shown, whereby the speed may be conveniently regulated.

Shaft 17 carries at its end a pinion 29 which meshes with a gear 30 on a countershaft 31 carried in bearings 32, 32 on a post to be referred to.

On the shaft 31, Fig. 4, is a pinion 33 in mesh with a gear 34 on a short shaft 35 in bearings 36, 36, on bracket 37, supported from the floor. The shaft 35 carries a worm 38 in mesh with a gear 39 on a shaft 40 also supported at one end in bracket 37 and at the opposite end in bracket 41 on the floor.

The shaft 40, Fig. 3, carries at its right-hand end a reproducer cam in the form of a disk 42 with a cam groove, not shown, in one face thereof, for controlling the positioning of the reproducing or verifying sound box and arm. On the shaft 40 adjacent this disk 42, Fig. 5, and coöperating therewith is a yoke 43, with a roll 44 in the cam groove referred to and not shown.

In the upper end of this yoke member 43, see Fig. 3, and in a socket 45 therein, is a sound arm positioning rod 46, the rod being locked in the socket by a pin 47 extended through the rod and the yoke end. The rod 46 is received by a guide 48 on the case, and by the table 13.

On the rod 46, and seated against the guide 48 and the end of the yoke 43, is a coil spring 49 which acts to normally retain the yoke in its lower position when not raised therefrom by the roll 44 and cam disk 42.

The rod 46 has connected thereto by a pin 50, the short arm of a bell crank sound arm positioning lever 51 pivoted at 52 to a bracket 53 suspended from the table 13.

The long arm of the lever 51, Fig. 3, is pivotally connected by a yoke 54 to the reproducing sound arm 55, having means for attaching a sound conveying tube 56 thereto, which, Fig. 1, may extend to any convenient point outside the cabinet, and having a reproducing sound box 57 and stylus 58 of any approved type at its inner end. This sound arm is supported for easy sliding longitudinal movement on a roll 59 in a bracket 60 on the table 13.

The shaft 40, Fig. 3, carries also, near the disk 42, a spiral gear 61 in mesh with a similar gear 62 on a shaft 63 carried in bearings 64, 64 on the floor. On the opposite and, Figs. 2, 5, right-hand end of the shaft 63 is a second and similar gear 62$^a$ in mesh with a gear 65 on a shaft 66 in bearings 67.

This shaft 66 carries a yoke 68 with a roll 69 in a cam groove, not shown, in a recorder cam disk 70, also on the shaft 66.

The upper end of the yoke 68, Fig. 5, carries a sound arm positioning rod 68$^a$ like the rod 46 referred to, and pivotally connected in like manner to the lever 71, pivotally connected in turn to the recording sound arm 72 having a recording sound box 73 and needle 74, and sound conveying tube 74$^a$, partly broken away. This tube, Fig. 1, may also extend through the cabinet, for use at any convenient point. The sound arm 72, like the arm 60, also rests on a roll 59 in a bracket 60, for easy longitudinal adjustment.

The shaft 40 also carries, Figs. 2, 3, 5, intermediate its ends, a mutilated gear 75, in mesh with a similar gear 76 on a shaft 77 in brackets 78, and carrying a turntable cam in the form of a disk 79 for raising and lowering the turntable 22 already described, to receive a tablet from the magazine to be described, to permit the performance of the various steps for completing the record and to position a tablet so that it may be ejected from the case.

The shaft 40 and gear 75 are always in motion, hence the provision of smooth-faced segments thereon and on gear 76 for the effecting of certain objects by other parts without interfering with the action of these gears. The gears 61, 62, shaft 63, gears 62$^a$, 65, and cams 42 and 70 are also always in motion.

The disk 79 has a cam groove, not shown, in which is received a roll 80, Fig. 4, on a yoke 81 embracing the shaft 77. This yoke 81 carries in a bearing 82 in its upper end, the vertical tablet carrier shaft 21 which, in turn, carries the tablet carrier or turntable 22, previously referred to, and imparts rotation thereto.

The magazine for the tablets, Fig. 4, comprises uprights 83 on the table 23 and on opposite sides respectively of the turntable, and connected by a top member 84 which may, of course, be integral therewith.

The member 84, Fig. 4, is provided with a depending tablet-holding rod 85 threaded therein and provided with a convenient hub 86 and adapted to receive the disk tablets 87 thereon, the tablets being spaced preferably, by hubs 87$^a$ thereon, or the tablets may each be provided with such a hub, if preferred.

On the member 83 are laterally movable, spring-actuated tablet holding and delivering members 88, 89, in the form of pins, the springs 90 being conveniently mounted thereon, and herein, between adjacent ribs 91, 92. The springs may be regulated as to tension by means of adjusting nuts 93 on the members 88, 89.

The upright magazine members 83, Fig. 4, have lips or flanges 94, 95, on their outer edges and receive therebetween tablet-holder, actuating rods 96 for controlling the action of the tablet holders, the rods carried by a beam 97 on the shaft 21. Springs 98 on the rods 96, see Fig. 4, seated thereagainst and against the under side of table 13 act to hold the beam normally in lower position. Stops 99 on the rods 96 determine the extent to which the springs can lower the beam 97. The collar 100 on shaft 21 engages the beam 97 on the upward movement of the shaft and acts to raise it and rods 96 against springs 98.

On each rod 96 and between the lips 94,

95, Fig. 4, is a tablet-feeding cam 101 which acts, as it is actuated up or down, to move the tablet holders 88, 89 to control the delivery or feeding of the tablets 87 by permitting withdrawal of the holders 88, 88, thereby releasing the lowest tablet for transfer to the turntable, as will be described, and compelling forward movement of the holders 89, 89, to receive thereon the next tablet above them and the lowest one on the spindle 85.

Referring now to the record tablet 87, I may use a tablet constructed of any of the well known substances suitable for that purpose, such as hard wax, metallic soap, and the like, which without treatment will receive and reproduce a limited number of times sound records, and may be called non-permanent tablets; or I may use tablets of shellac, varnish, or other suitable and similar substances, and having as a filler any of the suitable non-gritty substances commonly used therefor, as gutta-percha and resin, which tablets are harder, and for best results should be treated in some way to soften them for receiving the sound record, and subsequently hardened to enable unlimited reproduction of the record, which tablets may be called permanent tablets. Obviously, if wax-like or non-permanent tablets are used, simply for entertainment and for limited reproductions, the tablet may be at this point presented to the recording means in the manner hereinafter described.

If, however, the tablet used is one for unlimited reproduction of the record, or a permanent tablet, then proper treatment should be given it.

In either case with most substances it is convenient for reasons hereinafter mentioned, to use a tablet with a preliminary, smooth-faced groove already impressed therein which is subsequently perfected by the recording stylus into a record groove.

If a tablet composed largely of gutta-percha and resin is used, it can be softened by the application thereto of heat, as is already known, but such a tablet hardens relatively slowly, even when such hardening is assisted by the application of hardening agents such as chlorid of zinc.

I therefore prefer to use other means, such as the application of suitable liquid softening agents, as alcohol, for the purpose of softening the surface of the tablet preparatory to making the sound record therein.

I have discovered that, by impregnating the top surface of a hard, permanent tablet and the portion of the tablet immediately beneath the surface with some suitable substance that is naturally capable of receiving and retaining an impression, or readily cut by a stylus, such as certain kinds of wax, the formation of the sound record groove is assisted and a smoother groove and more accurate record is obtained.

I have found, moreover, that this wax-like substance can best be applied to the tablet in the form of a liquid in combination and simultaneously with the softening agent, or when held in solution by the softening agent, which is used as a vehicle for the wax.

If a record constructed of varnish or shellac, or the like, is used, with suitable fillers, I prefer to employ as a softening agent a liquid composed of substantially equal portions of benzol and acetone, holding in solution paraffin or any suitable wax-like substance, although I do not limit my invention to the use of these substances or the said relative proportions thereof.

The benzol and acetone attack the tablet, soften it, and at the same time carry into it for a certain distance the paraffin or wax, which apparently mixes with the tablet material and enables it more readily and accurately to receive the phonographic record, but apparently without materially affecting the durability of the sound grooves. The paraffin or other waxy substance appears to coat the surface of the tablet or of the preëstablished groove, if used, sufficiently to yield the same result that is obtained by cutting a groove in a soft tablet.

After the tablet constructed of shellac or varnish, as above set forth, has been rendered sufficiently soft, and the time required varies with the agents used for that purpose, and the composition of the tablet, the next step is to release the paraffin from its vehicle and remove the softening agents lest the softening process be carried too far.

This object I accomplish by treating the tablet with alcohol which causes the benzol and acetone to release most of the paraffin and then they evaporate readily with the alcohol, although other agents may be used, if preferred, for this purpose.

The surface of the tablet thus softened is ready to receive the phonographic impressions in the usual manner.

For thus treating the record tablet after its delivery to the turntable and preparatory to the recording of the sound vibrations thereon, I have provided the following novel means.

On the shaft 77 and at its, Fig. 2, left-hand end, is a spiral gear 102 in mesh with a similar gear 103 on a shaft 104.

The shaft 104 at its opposite end, Figs. 2, 6, carries a spiral gear 105 in mesh with a similar gear 106 on an upright shaft 107 in bearing 108 on the floor and 109 on the table 13.

At its upper end the shaft 107 is received by a bearing 110 on a bracket 111 on the table 13.

The shaft 107, Fig. 6, carries at its upper end a gear 112 in mesh with a gear 113 carrying on its upper face a hollow valve member 114 having a port 115, Fig. 7, adapted to register with passages 116, 117, 118 communicating with pipes 119, 120, 121, leading respectively to containers 122, 123, 124, for the tablet-treating elements to be described presently.

For automatically applying the tablet-treating elements to the tablet I have conceived the following novel means.

On the shaft 77, Figs. 2 and 6, is also an element-applying actuating cam disk 125. A yoke 126 adjacent this disk has a roll 127 which is received by a groove, not shown, in the disk 125. The yoke has a rod 128 carrying at its opposite end a rack 129 engaging a pinion 130 on an upright element-applying actuating shaft 131 having bearings 132 in the floor and 133 on the table 13.

The shaft 131 carries at its upper end a hollow tubular member 134 communicating with the valve 114, and it also carries any suitable tablet-treating or element-applying member, herein a brush 135 with a hollow back 136, shown in dotted lines, Fig. 6, communicating with the tube 134. By means of the brush the several tablet-treating elements are supplied to the record tablet in their proper order, as will be more fully described later on, and the brush combed of any material deposited thereon by a comb 136ª.

For forcing a current of air upon the tablet surface, a fan 136ᵇ operated by electricity from the same circuit as the motor may be used also as an evaporating and hardening means, if desired. The circuit 136ᶜ, including the battery and the fan, may be automatically closed and opened for this purpose at the proper times by contacts 136ᵈ and 136ᵉ and a rotating contact 136ᶠ on the shaft 107 properly positioned therefor.

For ejecting or delivering the record tablet after it is completed, I provide, Figs. 2, 3, on the shaft 77, also an ejecting cam disk 137 which actuates a rod 138 by means of a cam groove in the disk, not shown, and a roll 139 on a yoke 140 engaging the same. This rod carries at its outer end a rack 140ª in mesh with a pinion 141 on a tablet-ejecting shaft 142, suitably supported in bearings on the floor, not shown, and on the table 13.

On the end of the shaft 142 is a curved tablet-delivering arm 143 extended partly about the turntable circumferentially, and adapted on movement thereof by the shaft 142 to engage the tablet edgewise and push or slide the record tablet from the table 13 at the proper time, after the turntable 22 has been lowered, leaving the tablet on the table for that purpose.

A ridge 144, Fig. 2, adjacent the arm 143 extends therefrom to the front of the cabinet, and a similar ridge 144 on the opposite side of the table 13 extends from the front of the cabinet rearwardly toward and circumferentially partly around the turntable, toward the arm 143, to assist in guiding the completed record from the table.

For starting the machine, Figs. 1, 5, when used as a coin-controlled machine, a flattened coin-receiving slot 145 is provided at the front of the cabinet, leading to a tube 146.

Within the tube 146, Fig. 5, and forming a continuation thereof, is a second, smaller tube 147 with a laterally extended pin 147ª, which tube is vertically adjustable within the same, being held in raised position by a spring 148 secured to the table 13 and a post 149 on the tube 147, and having a vertically beveled slot 150 therein.

Within the tube 147 is a stop 151 in the form of a post, having a beveled upper end 152 to register with the beveled slot in the tube 147 when the latter is in its lowermost position. Above the tube 146 and adapted for use therein is a plunger 153 adapted for vertical movement in brackets 154, 155 on the case and having a handle 156 extended through the slot 157 in the cabinet for use by the operator, the brackets determining the extent of movement of the plunger.

Adjacent the tube 147, and below the table 13, is a coin receptacle 159 having a coin-receiving slot 160 also registering with the slot 150 in the tube 147 when the latter is in its lowermost position.

Adjacent the tube 147 is positioned, Fig. 5, one end of a trip lever 161, pivotally mounted, the opposite end resting beneath the lip of a pivoted contact 162 having a positioning spring 163 yieldingly securing it to the post 164. This contact is in the circuit 165, including the motor 4, shown here diagrammatically only, and the battery 166, the lever end 161 also being connected therewith and constituting the opposite contact. The lever 161 is retained in normal position, leaving the circuit open, by a spring 167 secured to the lever and the table 13.

For breaking the circuit and to move the contact 162, I provide a breaker 168 on a shaft 169, Figs. 3, 5, in post 78. On the opposite end of shaft 169 is a mutilated gear 170 in mesh with the like gear 76 on the shaft 77.

The magazine having been supplied with blank tablets 87, the operation of the illustrated embodiment of my invention is as follows:

The operator deposits the required coin in the slot 147, Fig. 1, and it rests in the tube 146, Fig. 5, in the position illustrated.

The handle 156, Fig. 5, is then pushed downwardly causing the plunger 153 to strike the coin, and depress it and the coin-holding tube 147 against the action of spring 148 until the pin 147ª engages the lever 161, The coin slides through the slots 150 and 160 into the receptacle 159. The pin 147ª depresses the lever 161, causing its opposite end to slide upwardly over the lip on and rest upon the contact 162 which yields by means of the spring 163 for that purpose.

This action of the lever closes the circuit 165 through the motor 4 and battery 166 starting the mechanism.

Motion is imparted to the shaft 9, Fig. 4, and by means of the bevel gear 15, and the gear 16, to shaft 17, and through gears 29, 30, 33, 34, and worm 38 to the gear 39 on the shaft 40 as described. By means of gears 75 thereon, and 76 on shaft 77 rotation of the turntable cam 79 is effected and this cam is so constructed and timed on the shaft 77 that it promptly acts through yoke 82 and its shaft 21, beam 97 and rods 96, and holders 88, 89 to raise the turntable to substantially meet the rod 85 and to receive the lowermost tablet 87 therefrom. At this time the positions of the gears 75, 76, and cams 42, 70, and rolls 44, 69, coöperating therewith, are as shown in Figs. 5 and 9. The cam, 101, in the meantime, Fig. 4, has moved upwardly pushing the fingers 89, beneath the second disk to hold it in position. The fingers 88, have been withdrawn by the springs 93 from beneath the first or uppermost disk permitting it to fall upon the turntable 22.

In Figs. 5 and 9, the gear 75 is shown in the position it occupies when the machine is started, and in Fig. 8 the movement of the turntable upward to the magazine to get the tablet is represented by the line from S to M, and Fig. 10 shows the movement of the parts to the point of receiving the tablet. During this period the gears 75, 76, and cam 79 have advanced from the positions shown in Fig. 9 to those of Fig. 10, the roll 80 on the turntable yoke 81 being shown as in its elevated position to place the turntable and blank disk properly for the application of the tablet-treating means. Further rotation of the cam lowers the turntable and its tablet to the proper position for application of the softening agent by the brush 135.

In the meantime rotation has been imparted to the valve 114 through the shaft 77, gears 102, 103, shaft 104, gears 105, 106, shaft 107, gears 112 and 113, to cause its port to register with the passage through pipe 119 to the receptacle containing the tablet softening agent.

This agent flows by means of pipe 134 to the brush 135, and through usual perforations therein, not shown, to the tablet. The brush is now swung laterally, see dotted lines Fig. 6, through the action of shaft 77, brush cam 125, roll 127, yoke 126, rod 128 and rack 129, and pinion 130, with shaft 131 to bring it in contact with the tablet on the turntable. The rotation of the turntable and tablet obviously causes a film of the softening agent to be applied to the tablet. Of course the several cams are properly timed on the several shafts to perform their proper functions, step by step, and the different gears are properly proportioned to effect desired speed of the various shafts and gears.

After a suitable time has elapsed for the action of the softening agent, the brush is next supplied with alcohol for precipitating the paraffin from the softening element by means of the valve 114 which has through the cam 125, and roll 127, been rotated until its port 115 registers with the pipe 120 leading to receptacle 123 containing the alcohol.

After the alcohol has been applied to the rotating tablet in the same manner, by the brush 135 operated by the cam 125, and roll 127 the brush is again swung back by its cam to normal position, Figs. 2, 3, 4.

The paraffin having been largely precipitated by the application of the alcohol, the next step is the making of the sound record.

As already explained the various parts are so timed, as to action, to allow the necessary period to elapse between the successive steps, and these periods are indicated to the operator by means of the dial 170 and pointer 171 on the cabinet 1.

While the tablet softener and alcohol are being applied the gear 75 advances to the extent represented by the gear segment D, to the ends of the arc marked "Chemicals," Figs. 5, 11, and the smooth-faced segment T will now register with the smooth-faced segment T on gear 76 during the rotation of these gears to that extent, while the smooth-faced segment U Fig. 5 on gear 76 will register with the smooth-faced segment U on gear 170ª,—not shown,—and the breaker 168 is advanced to the same extent. During this time the gears 75, 76, and turntable cam 79, recorder cam 70, and reproducer cam 42, have progressed to the point indicated in Fig. 11, the gear 75 having rotated to the extent of the segment marked D. The rolls 44, 69 and 80 have progressed in their paths on their several cams 42, 70 and 79 as indicated, the turntable roll 80 being again in its elevated position. As already stated, the cams 42, 70, and rolls 44, 69, are not on the same shaft, but as they are on parallel shafts and work simultaneously they are, for purposes of illustration, shown here as on one shaft so that their relative movement may be more clearly understood than if they were shown in separate figures.

In the meantime, while the paraffin was being absorbed by the softened surface of the tablet, and the alcohol, benzol and acetone were evaporating, the recorder cam 70 through the connections described, and rolls 69 has acted upon the roll 69 to cause it to raise the rod 68ª to throw the lever 71 and sound box 73 forward and thus to position the recording stylus over the edge of the tablet 87 on the turntable, which is now raised by the cam 79 see Figs. 8, 11, to bring the tablet in contact with the stylus. Of course any type of record groove can be formed, the type made herein being of the vertically undulating type, the dial now indicating to the operator that the tablet is in condition to receive the sound record, the operator withdraws the tube 74ª and mouthpiece, Fig. 1, and talks therein.

The shaft 40, gear 75 and the shaft 63 being always in rotation, the smooth segment T on the gear 75 and gear 76 permits the former to rotate without affecting the latter, and during this period the recording is effected.

The operator may talk until the pointer 171, which has been regularly advanced by the means described, reaches the mark 176, stopping, of course, earlier if he wishes. In any event the turntable will rotate with the tablet for receiving sound impressions until the time indicated. That is until the gears 75, 76 have rotated the length of the smooth segments T to the toothed segment H.

While the tablet surface will naturally harden with the complete evaporation of the benzol, acetone and alcohol, it can be expedited by the use of either a chemical or water with or without an air current, but I prefer the latter means which I have found satisfactory. A fan 136ᵇ operated from the motor 4 is shown herein for this purpose.

The recording operation being completed, the turntable cam 79 lowers the table to the proper point, represented by W on diagram, Fig. 8, and the segment H on gear 75, page 11, to permit the application of the hardening liquid by the brush 135 which is effected by the further rotation of the valve 114 as already described. After this is effected which is within a few seconds or a minute, and the tablet is sufficiently hardened again, the cam 79 again acts by means of the raised portion of the cam 79, Fig. 12, to raise the turntable and tablet to meet the reproducing stylus 58 which in the meantime has been properly positioned by the action of its cam 42, the roll 44 advancing from its position in Fig. 11 to that of Fig. 12, the recording arm 72 and stylus having at the same time been withdrawn by its cam 70, as shown by its movement from the position of Fig. 11, to that of Fig. 12.

A brush 58ª is positioned on the ejecting arm so that when the recording stylus is withdrawn laterally it will engage the brush and be cleaned of any shavings that may adhere to it.

When the reproducing or verifying stylus has been positioned Fig. 12 it is so indicated by the pointer arriving at the segment marked "Listen" on the dial and the operator then withdraws the tube 56 and its ear piece, and listens if he so chooses, to the reproduction of the message he has just recorded.

During this reproduction the gear 75 advances the length of the smooth segment R, the section R registering with the section U on the gear 76, the gear 75 coming again to the starting point, Fig. 5, and the segment T on the gear 76 registering with the segment T on the gear 170ª.

When the reproduction is finished Fig. 12, the roll 80 drops to the lower portion of the cam 79 and acts to lower the turntable to the level of the table 13, to the point represented on the diagram as D, leaving the verified tablet resting on the edge of the table above the pocket, and the ejector cam 137 acts to swing the arm 143 against the edge of the tablet and causes it to slide edgewise between the guides 144 down the inclined shelf 3ᶜ for delivery to the operator. While the drawings show the shelf 3ᶜ for the reception of the tablet outside the machine and case, it is obvious that the tablet may be delivered at any other convenient point without the machine, that is, outside of or free of the operating elements.

When it is desired to operate the machine independently of the coin-controlling feature, it will only be necessary to open the cover 3 of the cabinet, insert a pin through the hole 172, see dotted lines Fig. 5, in the tube 147 so that the plunger may contact therewith instead of with the usual coin, and force the tube 147 down until the pin 147ª engages the lever 161.

Obviously the foregoing described construction may be modified in the many details all within the spirit of my invention and scope of the following claims.

Claims:

1. A combined sound recording and verified record tablet delivering machine comprising a tablet carrier, means for recording sounds on the tablet, sound reproducing means therefor, means for delivering the tablet bearing the sound record without the machine, and means for causing the performance of said functions in regularly progressive sequence.

2. A combined sound recording and verified record tablet delivering machine comprising a tablet carrier, means for recording sounds on the tablet, and means for delivering the tablet bearing the sound record without the machine, and means for causing the performance of said functions in progressive sequence.

3. A combined sound recording and verified record tablet delivering machine comprising a tablet carrier, means for recording sounds on the tablet, means for delivering the tablet bearing the sound record without the machine, a device actuated by the operating means indicating the time for beginning and completing the recording operation; and means for operating the same to perform said functions in progressive sequence.

4. A verified record tablet delivering machine comprising a tablet carrier, means for reproducing the sound record thereon, mechanical means indicating the time for the beginning of the reproduction, means for delivering the tablet bearing the sound record; and means for operating the same to cause it to perform the functions in progressive order.

5. A combined sound recording and verified record tablet delivering machine comprising a tablet carrier, tablet treating means to prepare the tablet to receive a record, sound recording means to record a record in the tablet as prepared, means for delivering the tablet bearing the sound record without the machine, and means for controlling the recording, treating and delivering means in progressive order.

6. A combined sound recording and verified record tablet delivering machine comprising a tablet support, a tablet carrier, sound recording means to act on the tablet while on the carrier, means for delivering a tablet bearing a sound record without the machine, and means for operating these elements in progressive order.

7. A combined sound recording and verified record tablet delivering machine comprising a tablet support, a tablet carrier, sound recording means to act on the tablet while on said carrier, sound reproducing means to reproduce the record on the tablet, means for delivering the tablet bearing the sound record without the machine, and operating means for effecting the said operations in progressive sequence.

8. A combined sound recording and verified record tablet delivering machine comprising a tablet support, a tablet carrier, means to transfer a tablet to the carrier, means for recording sounds on the tablet, means to deliver the tablet bearing the sound record without the machine, and means for performing said functions in regularly progressive sequence.

9. A combined sound recording and verified record tablet delivering machine comprising a tablet support, a tablet carrier, means to transfer a tablet to the carrier, means for recording sounds on the tablet, mechanical means indicating the time for the beginning of the verification, means to deliver the tablet bearing the sound record without the machine, and means for operating the same to perform said functions in regular progressive sequence.

10. A combined sound recording and verified record tablet delivering machine comprising a tablet support; a traveling tablet carrier; means for recording sounds on the tablet, means to present the carrier successively to the tablet support and sound recording means; and means to deliver the tablet bearing the sound record without the machine, and means for causing the performance of said functions in regularly progressive sequence.

11. A combined sound recording and verified record tablet delivering machine comprising a tablet support, tablet treating means to prepare it to receive the sound record, a traveling tablet carrier; means for recording a sound record on the tablet, sound reproducing means therefor, and means to present the carrier successively to the tablet support to receive the tablet, tablet treating means, sound recording means, and sound reproducing means; means to deliver a tablet bearing a sound record, and means for causing the performance of said functions in regularly progressive sequence.

12. A combined sound recording and verified record tablet delivering machine comprising a tablet magazine, the magazine comprising a frame with a depending tablet supporting rod, tablet holding and releasing means including spring-controlled fingers for holding and releasing the tablets, a cam, and connections between the cam and fingers for controlling them; tablet treating means to prepare the tablet to receive the record, and means for recording sounds on the tablet; a traveling tablet carrier, means for presenting the carrier to the magazine to receive the tablet, and the carrier and tablet to the recording means; means to deliver a tablet with a sound record thereon, and means for performing said functions in regular, progressive sequence.

13. A combined sound recording and verified record tablet delivering machine comprising a tablet magazine; tablet treating means to prepare the tablet to receive a sound record; sound recording means to record the sound record on the tablet; a traveling tablet carrier, means for presenting the carrier to the magazine and the carrier and tablet to the treating means and recording means, comprising a cam; and means to deliver the tablet bearing the sound record, and means for causing the performance of said functions in regular, progressive sequence.

14. A combined sound recording and verified record tablet delivering machine comprising a tablet magazine; tablet treating means comprising a plurality of treating-element-discharging members, a means for releasing the elements at proper times and an applying member for the elements, adjustable relatively to the tablet; means for recording sounds on the tablet, a traveling tablet carrier; means for presenting the carrier to the magazine and means for presenting the carrier and a tablet to the treating means and recording means; and means for delivering the tablet with the sound record thereon, and means for effecting said operations in regular, progressive sequence.

15. A combined sound recording and verified record tablet delivering machine comprising a tablet magazine, tablet treating means to prepare it to receive the record; means for recording sounds on the tablet comprising a longitudinally movable sound arm, its sound box and needle; means to operatively position it and withdraw it; a traveling tablet carrier and means for presenting it alone to the magazine to receive the tablet, and with a tablet to the treating means, and recording means; and means to deliver the tablet bearing the sound record without the machine, and means for performing said functions in regular, progressive sequence.

16. A combined sound recording and verified record tablet delivering machine comprising a tablet magazine, tablet treating means to prepare the tablet to receive the sound record, sound recording means to act on said record, and sound reproducing means to reproduce the record, each comprising a longitudinally movable sound arm, its sound box and needle; means to operatively position the recording means and the reproducing means and withdraw it; a traveling tablet carrier and means to present it alone to the magazine to receive the tablet, and with the tablet to the treating means, recording means and reproducing means; and means to deliver the tablet bearing the sound record without the machine, and means acting to cause the performance of said function in regularly, progressive sequence.

17. A combined sound recording and verified record tablet delivering machine comprising a tablet magazine, tablet treating means to prepare the tablet to receive the record, and sound recording means to record the sound record on the tablet; a traveling tablet carrier, means to present it alone to the tablet magazine to receive a tablet, and with a tablet to the treating means and the recording means; and means including a movable arm, and a cam for operating the same, to deliver a tablet with a sound record thereon without the machine, and means to effect said functions in regularly, progressive sequence.

18. A combined sound recording and verified record tablet delivering machine comprising a tablet magazine, tablet treating means to prepare the tablet to receive the record, sound recording means to record the sound record on the tablet and sound reproducing means; a traveling tablet carrier, means to present it alone to the magazine to receive the tablet, present it with a tablet to the treating means, the recording means, and the reproducing means; means to indicate to the operator the beginning and ending of the recording period; and means to deliver a tablet with a sound record thereon without the machine, and means to effect said functions in regularly, progressive sequence.

19. A combined sound recording and verified record tablet delivering machine comprising a tablet magazine, tablet treating means to prepare the tablet to receive the record, sound recording means for recording the sound record on the tablet; a traveling tablet carrier, means to present it alone to the magazine to receive a tablet, and with a tablet to the treating means, and the recording means; means to indicate the duration of the recording period; and means to deliver a tablet bearing a sound record without the machine, and means to effect the performance of said functions in regular, progressive sequence.

20. A machine of the class described comprising a magazine for blank record tablets, means for taking a tablet from the magazine and presenting it to tablet-treating means to soften it preparatory to forming a record thereon, sound recording means, means to present the softened tablet and the recording means to a common point of contact to record the sounds on the tablet, sound reproducing and verifying means, means to present the tablet and sound verifying means to a common point of contact for reproducing the record and to enable the operator to verify the same, and verified tablet delivering means to deliver the tablet to the operator without the machine, said steps being performed in progressive sequence.

In testimony whereof, I have signed my name to this specification.

HENRY L. WADSWORTH.